3,501,319
**METHOD OF PREPARING ARTIFICIALLY
SWEETENED FREEZE DRIED FRUITS**
Dale J. Ewalt, 300 Briarhill Drive, and Ralph E. Kenyon,
56 N. 27th St., both of Battle Creek, Mich. 49015
No Drawing. Filed Feb. 2, 1966, Ser. No. 524,472
Int. Cl. A23b 7/02
U.S. Cl. 99—204                                11 Claims

ABSTRACT OF THE DISCLOSURE

Enhancing the flavor of freeze-dried fruit by freezing the fruit, adjusting the temperature of the frozen surface of the fruit to just below the melting point, contacting the frozen fruit with a water solution containing a flavor enhancer, hereby effecting the melting of the liquefiable constituents at the fruit surface with the resultant intermingling of the flavoring solutes with the fruit constituents present in said melted fruit surface, reducing the temperature of the fruit to a point well below the crystallization temperature of the water solution thereby refreezing said solution, and freezing-drying the frozen fruit. The flavor enhancer solution may contain a freezing point depressant to accelerate the melting of the fruit surface.

---

This invention relates to a process for enhancing freeze-dried fruit tissue generally with a desirable flavoring adjunct such as an artificial sweetener.

Workers have contemplated addition of flavor enhancers to plant tissue which have been frozen and thereafter freeze-dried. Such pre-flavor or pre-sweetened dried fruits can thus be rehydrated in aqueous liquids in a convenient ready-to-eat condition. The morphology of plant tissues is usually such that addition of water soluble flavor enhancers like sweeteners to fruit preparatory to freeze-drying is likely to result in an undesirable "frosty" coating which stems from localization on the surface of the plant material of the crystallized enhancer due to its inability to penetrate the fruit surface. Thus, in the case of artificial sweetener solutions such as those of sodium and/or calcium cyclamates or saccharin or mixtures thereof which may be sprayed to frozen fruits, the artificial sweeteners will not migrate sufficiently to the interior of the fruit tissue, and instead will be localized on the surface thereof. This, in turn, gives rise to the appearance on the surface a subsequently freeze-dried fruit piece of a visible crystalline coating which detracts from the natural appearance of the dried fruit.

On the other hand, the addition of an enhancing substance to many plant tissue such as fruits like strawberries, peaches, blueberries and like produce is desirable due to the fact that the freeze-dried produce, upon rehydration, are preferably served in a bland, sweetened or otherwise flavored condition.

It is the object of the present invention to provide a process whereby flavor-enhancing agents can be incorporated onto the surface of whole or subdivided pieces of freeze-dried plant tissue like fruits without detracting from the natural appearance of the fruit. More specifically, it is an object of the invention to treat fruits which are intended to be consumed in a presweetened form and enhanced by the addition of artificial sweeteners so that they retain their natural color after being so enhanced and freeze-dried. Other objects of the invention will be appreciated by those skilled-in-the-art from the following description.

Briefly stated, the invention comprises causing a piece of plant tissue such as a fruit to be frozen to a temperature above the eutectic point of the piece and causing at least a portion of the water-miscible pigments located at the surface of the piece to liquefy; applying a solution of water soluble, flavor-enhancing material to the surface of the piece; and causing said solution to intermix with said liquefied pigments to an extent such that the piece can then be recooled and freeze-dried without formation of a grossly visible white crystalline substance on the surface of the piece.

Preferably, the objects of the present invention are accomplished by lowering the freezing point of an aqueous solution containing the enhancing agents, e.g., artificial sweeteners, as well as the liquefiable constituents at the surface of the fruit piece so as to promote intermixing of the plant pigments and the flavor-enhancing agents while the interior of the fruit remains in a substantially solid condition. A preferred practice in accordance with the invention is to employ in the flavoring solution a freezing point depressant such as an edible mono- or polyhydric alcohol like ethyl alcohol or propylene glycol, or an oligosaccharide as that term is hereafter defined such as invert syrup. In the case of fruits the flavor-enhancing agent will be exemplified by one of the aforesaid artificial sweeteners or mixtures thereof; thus an aqueous solution of the artificial sweetener has its freezing point sufficiently reduced so that it will cause the aqueous ingredients at the surface of the fruit to melt and cause the artificial sweetener solute to intermingle with the thus liquefied constituents on the surface of a fruit piece.

Alternatively, and as a less preferred embodiment of the invention, a frozen plant tissue piece adjusted to a temperature only slightly below the ice crystallization point in the fruit may have a flavor-enhancing aqueous solution, such as one containing artificial sweeteners, applied to the surface of the piece; the surface of the piece with the flavoring solution applied thereto will be caused to assume a temperature whereat its surface liquids, particularly the coloring matter therein, will intermingle with the enhancing material sufficiently until such time as the piece may be thereafter frozen and freeze-dried without the added flavorants being grossly visible. This practice is less preferred because of the prolonged holding period required to cause the flavor-enhancing solution to sufficiently intermix with the liquefied surface portion of the plant tissue and the companion problem of controlling temperature of the piece during such period so as to avoid undue liquefaction on the surface of the piece which can result in surface deformation incident to such thawing and consequent clumping or clustering of the fruit.

However, the invention is not to be construed in its scope to the more preferred embodiment of employing a freezing point depressant for the flavor-enhancing solution and any means or method which will promote distribution of water soluble, crystallizable, flavor-enhancing solute throughout the surface of the plant piece and cause localized intermixing of the miscible liquefield plant pigment at the plant surface with the enhancing solute preparatory to further freezing and complete solidification of the piece may be employed. The present invention is founded in its broadest aspects on the discovery that a crystallizable water soluble flavor enhancer such as the artificial sweeteners above-mentioned can be effectively distributed throughout the surface of plant tissue after substantial freezing thereof and preparatory to freeze-drying by causing a localized surface liquefaction at the exterior of said tissue so as to permit intermixing of the enhancing agent in solute form to an extent which renders the additive substantially indistinguishable in the freeze-dried plant tissue.

Among the plant tissues that may be treated in accordance with the process of present invention are fruits such as strawberries, peaches, blueberries, cherries, raspberries and similar fruits although other fruits which can be similarly enhanced by the addition of a flavorant can also be so treated, the benefits of the present invention being most applicable to treatment of those tarty fruits which are preferably sweetened before eating and hence, which call for addition of a sweetening agent to enhance the natural flavor of the fruit. However, the invention is not to be restricted to the class of fruits generally, but can be applicable to any plant tissue which may have disirably added thereto a flavor-enhancing crystallizable material which, in a minor amount, balances the natural flavor of the plant tissue. The term "fruit" is to be understood in this broader context.

Among the useful flavor-enhancing agents that can be surface applied in accordance with the present invention, are the members of the class popularly known as "artificial sweeteners" which include such agents as the sodium and calcium cyclamates, saccharin.

Preferably, although not necessarily, the plant tissue, typically the fruits like strawberries and peaches, will be subdivided to halves or slices; some fruits, such as blueberries, have an integument and are preferably eaten whole, but the invention nevertheless is applicable to the treatment of such whole fruit, particularly when the same is punctured to permit access of the flavor-enhancing solution therein prior to freeze-drying.

The plant tissue will desirably be slow frozen in a manner like that described in copending application Ser. No. 323,076, filed Nov. 12, 1963, by Vollink et al., entitled "Improved Method for Dehydrating Fruit," now Patent No. 3,395,022. By following the techniques of slow freezing set forth in said application, the aqueous phase of the fruit will be so prepared by freezing that the eventual freeze-dried product will be more readily rehydratable due to the rupture of cell tissue that occur due to growth of large ice crystals during freezing. However, the benefits of the present invention are not to be confined to those areas where the plant piece is prepared for freeze-drying by slow freezing as set forth in said application since fruits such as strawberries may be more rapidly frozen while still benefitting in appearance upon the addition of flavor enhancers specified herein.

Generally fruit pieces will be frozen by reduction to a temperature of zero degrees F. or below upon harvesting, whereafter the fruit will be stored at that temperature until further processing is performed. The thus stored piece will preferably be sliced and to achieve this result the whole or sub-divided piece will be tempered by allowing it to elevate to an average product temperature below 28° F. and generally in a neighborhood of about 10° to 25° F. whereby the piece can be sliced, punctured or otherwise subdivided preparatory to flavoring. In the case of blueberries and like fruits having an integument which may impede rehydration, the fruit will be punctured after such tempering in the manner described in co-pending application Ser. No. 480,473, filed Aug. 17, 1965 by Scharschmidt et al., entitled "Food Product and Process." Other fruits such as strawberries will be similarly "tempered" to the aforesaid average temperature whereby the strawberry can be sliced without shattering prior to flavoring.

It is a preferred practice of the present invention to thus temper the fruit piece to a temperature just below the melting point of the liquefiable constituents at the surface hereof so that a portion of the fruit will become liquefied by subsequent addition of the solution containing a freezing point depressant and will thereby release mutual solvents for the flavor enhancing solutes and natural plant pigments so that these fruit coloring agents are in a condition to intermix with the flavor enhancing additives. However, it is not critical or essential but only preferred that the fruit be so tempered before application of the additive solution, since such liquefaction of said natural pigments at the surface can be caused to take place during and subsequent to application of a flavoring-enhancing solution containing a freezing point depressant. Typically the fruit is "warmed" or tempered to a temperature in the neighborhood of 10°–25° F. preparatory to addition of the aforesaid flavor-enhancing solution. This may be achieved by depositing the substantially frozen fruit on a continuous belt traveling within a tunnel freezer wherein air at a temperature of 25°–30° F. is caused to pass through the fruit on the belt as it travels through the tunnel, the residence time of the fruit required to achieve such tempering being dependent upon such factors as the rate of travel and the bed depth but usually being for a period of 10–15 minutes. On the other hand, the fruit may be tempered under stationary conditions wherein the fruit is held in an atmosphere of air at a temperature of 25°–30° F. for a period in the neighborhood of twenty-four hours and air at said temperature is caused to pass over and around the fruit at the rate of 20–25 feet per minute. By so preparing the fruit pieces they are in a condition whereby a minimum of surface treatment both from the standpoints of time and amounts of flavor-enhancing solution are required to cause surface liquefaction. Also, eventual clumping or clustering of the refrozen product following the application of the flavor-enhancing agent is avoided. Refreezing is accomplished simply by relowering the temperature of the piece to below 5° F. if the product is to be freeze-dried directly thereafter, or to a temperature 0° F. or below if the product is to be held for any significant period of time preparatory to freeze-drying.

The flavor-enhancing solution containing such agents as the cyclamates and saccharin in aqueous solution is preferably sprayed onto the tempered fruit piece, the solution being previously formulated with a sufficient concentration of flavorants to assure the desired degree of sweetness or other enhancement concomitant with natural flavor level of the fruit, while not calling for an undue amount of aqueous carrier such as can occasion excessive liquid water application to the fruit surface. Similarly the duration of the application of the enhancing solution should be limited to that required to simply adequately cover the fruit surfaces with the flavor-enhancing solution, uniform and complete coverage being generally preferred. However, the flavoring enhancer may be applied to the fruit piece by a brief dip during which period the elapsed time of contact between the enhancing solution and the fruit piece is controlled to a period of less than 10 seconds.

As indicated above, the flavor-enhancing solution is preferably formulated to contain material such as an alcohol like propylene glycol, or ethyl alcohol, or a low molecular weight saccharide such as invert sugar. The term "alcohol" refers to an edible alcohol with one or more hydroxyl groups and although it is intended to embrace the most typical such alcohol, namely glycerol, or ethyl alcohol, it also applies to a variety of other water-miscible sugar alcohols. Preferably, the alcohol is of a low molecular weight so as to offer a substantial effect in decreasing the freezing point of the flavor-enhancing solution and the liquefiable materials on the surface of the frozen fruit piece treated therewith.

"Oligosaccharides," however, may also be so employed as freezing point depressants and typical of this group are common commercially available reducing hexoses and/or the di-, tri- and other lower saccharides; the term "oligosaccharides" is intended to embrace not only sugars like total invert syrup, dextrose and maltose, but also the broad class of reducing saccharides. Generally, the term "oligosaccharides" is intended to embrace lower di- and trisaccharides, as well as hexoses. The oligosaccharides of use in accordance with this invention, however, should be only those which do not crystallize readily.

All of the members of the aforesaid freezing point depressants should be compatible flavorwise with the flavor-enhancing additive as well as the natural flavor of the fruit itself and should also serve to sufficiently lower the freezing point of the aqueous solution containing the enhancers, e.g., cyclamate and/or saccharin as well as the natural liquefiable constituents in the surface of the fruit itself, to assure the desired surface intermixing of the additive with the natural fruit pigments. Usually a reduction in the freezing point of the flavor-enhancing solution of 4° to 22° F. and most typically 6° to 12° F. will suffice to provide the desired effects, the freezing point reduction being dependent to some extent upon the nature of the fruit. In the case of fruits like strawberries and peaches which have a water crystallization zone in the neighborhood of 28° F., i.e., the solidification temperature of water contained in the fruit, it will be preferred to use a flavor-enhancing solution which has its freezing point reduced to about 26° F. or below; on the other hand, fruits such as bananas and like fruits having higher water soluble solids therein will have a free water crystallization zone much lower than 28° F. depending upon the relative concentration of such soluble solids in the fruit, but usually will call for a use of a flavor-enhancing solution whose freezing point is reduced well below 26° F. Generally, the level and character of the freezing point depressant should only be such as to lower the freezing point of the liquefiable constituents at the surface of the fruit and the flavor-enhancing additive in solution to assure that amount of intermixing of the enhancer with the surface liquid required while avoiding excessive thawing of the fruit piece and consequent softening and liquefaction during subsequent handling in the course of refreezing.

The preferred freezing point depressant of use in accordance with this invention is invert sugar. Generally, the flavor-enhancing solution may contain anywhere from 7.5–35% of such an oligosaccharide. In the case of alcohols such as ethyl alcohol, on the other hand, a concentration of 2.5 to 20% in said flavor-enhancing solution may be used and in the case of propylene glycol specifically, another preferred additive, a concentration of 5 to 15% by weight of the flavor-enhancing solution can be employed to advantage. The concentration of such freezing point depressants in said solution will be dependent to some extent also upon the procedure used to apply the enhancer as well as the character of the plant material being treated. But, typically, it will be found that the solution may be applied at a ratio of 1.5 to 4.5 lbs. per 100 lbs. of frozen fruit and like plant material. Typically, a flavor-enhancing solution containing an artificial sweetener at such a concentration can be applied to any number of fruits which have been tempered to a product temperature ranging from 18° to 22° F.

The invention will now be more fully described by reference to the operative examples:

EXAMPLE I

A five gallon batch of sweetening solution was prepared by mixing together the following ingredients:
(a) 2.7 lbs. of a 7 to 1 blend of sodium cyclamate and sodium saccharin;
(b) 2.0 lbs. of propylene glycol;
(c) 36.85 lbs. of hot water (130° F.).

Whole frozen fruit (e.g., strawberries) at 0° to −5° F. was tempered in a tunnel freezer for 12.5 to 15 minutes on a belt using an air temperature of 22° to 27° F., the fruit being metered onto the belt continuously at a bed depth such as assured that the fruit emerged from the belt after the elapsed period of 12.5 to 15 minutes with an internal pulp temperature of 20° to 22° F. The thus tempered fruit, typically strawberries, but commonly any one of a variety of popular fruits such as peaches, pears and the like at the aforesaid internal pulp temperature have the surface portions thereof substantially solid. The aforesaid sweetening or flavor-enhancing solution was sprayed onto the product, preferably after it had been directed into rotating slicers or halved. In the case of strawberries the sliced fruit was passed into a 3 foot diameter reel revolving at 12 r.p.m., nozzles being positioned within the reel so that at least the final 25% of the reel length was available to tumble the sweetened fruit and adequately coat all of the product with the sweetening solution sprayed thereon. The sweetening solution was sprayed on at the rate of 37.5 lbs. per 2500 lbs. of frozen fruit. By virtue of the reduced freezing point of the sweetening solution, the solution penetrates the fruit and intermixes with fruit pigments prior to refreezing, thereby assuring that a sufficient length of time is provided for the sweetener solution to harden on the surface and further assuring that increased sweetener penetration of the fruit surface is obtained. In this way, a high level of addition of sweetening solution may be practiced without encountering a crystallizable residue of sweetener on the surface of the fruit at any such high level of addition.

Immediately after addition of the sweetening solution, the fruit was recooled to a temperature from 0° to −10° F. by passing the fruit through a refreeze tunnel using an air temperature of −20° to −35° F. and a residence time of 5 minutes. The refrozen fruit was then freeze-dried in a conventional manner. The freeze-dried fruit did not have a white residue of sweetener on the surface thereof and had an appearance which was substantially unchanged as compared to a freeze-dried fruit having no sweetener added. By virtue of the generally solid condition of the interior of the fruit, despite the addition of the sweetening solution to the surface thereof and the minimal surface softening that occurs incident to surface liquefaction, the fruit is in a substantially discrete condition and the pieces are not deformed during their handling in the refreezing tunnel. As a consequence the fruit has an appearance, both in the dried and the reconstituted form, that is acceptable in that it is free of surface deformation and is not clustered. Although the foregoing specific example has been described by reference to product such as strawberries which is destined to be freeze-dried, the product may also be reduced to a stable moisture content by having at least a major part of the moisture content of the fruit sublimed, the remainder of the drying operation being carried out by vacuum air drying which may precede or follow sublimation and be carried out under conditions wherein the fruit is allowed to warm to temperatures above 0° F. and the moisture is removed by evaporation rather than sublimation.

In all such applications, application of the sweetening or flavor-enhancing solution containing the freezing point depressant promotes the adequate penetration of sweetening agent to the surface such that the dried product is substantially free of any visible crystallizing sweetening agent such as the cyclamates or saccharins specified herein.

EXAMPLE II

A five gallon batch of sweetening or enhancing solution was prepared by mixing the following ingredients:
(i) 2.7 lbs. of a 7 to 1 blend of sodium cyclamate and sodium saccharin;
(ii) 2.1 lbs. of 190 proof ethyl alcohol;
(iii) 36.7 lbs. of hot water (130° F.).

The foregoing sweetening solution was applied as outlined for the procedure set forth using propylene glycol in Example I. The resulting freeze-dried product had an excellent appearance, being quite similar to the unsweetened product in that it was free of any "frost" or other visible manifestation of a sweetening additive on the surface thereof. Generally in following the foregoing procedures of Examples I and II, it is preferred to use alcohol concentrations in the neighborhood of 5 to 10% of the sweetening solution, freedom from any grossly visible white crystalline residue being increased as the alcohol level is increased.

EXAMPLE III

A five gallon batch of sweetening solution was prepared by mixing the following ingredients: 5 lbs. of a 7 to 1 blend of sodium cyclamate/sodium saccharin were prepared and mixed with 4.2 lbs. total invert syrup (92% minimum on a dry basis calculation) and 32.4 lbs. of hot water (130° F.). The fruit was handled identically to the procedure described with respect to Example I, with the exception that the application rate of sweetening solution was 41.7 lbs. per 2500 lbs. of fruit per hour. The dry fruit had a minimal amount of white residue visible and looked very similar to unsweetened product.

EXAMPLE IV

A less preferred procedure is to omit from a sweetening solution the freezing point depressant, either the propylene glycol, ethyl alcohol or the total invert sugar. Instead, the sliced fruit is tempered to a temperature of 22° to 24° F. and the sweetener is applied at room temperature (50° to 80° F.). The procedure to be followed in such an event may be substantially like that set forth in operating Example I. However, care must be exercised to assure that the warmed fruit slices do not mat together in the coating reel since after refreezing the fruit would otherwise discharge in large lumps making it difficult to handle the product in subsequent loading operations leading to the dehydration step.

Although the invention has been described by means of operative examples wherein the preferred flavor-enhancers of use are blends of sodium cyclamate and sodium saccharin, other flavor enhancers are satisfactory such as calcium cyclamate, calcium saccharin, blends of calcium cyclamate and calcium saccharin, potassium cyclamate, potassium saccharin, blends of potassium cyclamate and potassium saccharin, hexamic acid, glycyrrhizin, vanilla and ethyl vanillin.

What is claimed is:
1. A method of enhancing the flavor of freeze-dried fruit tissues without imparting a glazed appearance to the surface of the fruit which comprises
   (a) freezing the fruit,
   (b) adjusting the temperature of the surface of said frozen fruit to a point just below the melting point of the liquefiable constituents at said surface,
   (c) contacting the surface of said fruit with a water solution of flavor enhancer having a temperature higher than said fruit surface and having water-soluble crystallizable flavor solutes to thereby cause the melting of the liquefiable constituents at said fruit surface,
   (d) maintaining said water solution of flavor enhancer in a liquid state for a period sufficient to promote intermixing of the flavor solutes with liquefied fruit constituents at the surface of said fruit,
   (e) reducing the temperature of the fruit surface to a point below the crystallization temperature of the mixture of water solution of flavor enhancer and liquefiable constituents at said fruit surface, thereby refreezing said mixture, and
   (f) freeze-drying the frozen fruit.
2. The method of claim 1 wherein said flavor solution contains an artificial sweetener.
3. The method of claim 1 wherein said flavor solution has a freezing point depressant added thereto in amount sufficient to cause said fruit tissue to undergo a reduction in its ice crystallization point at the surface portions thereof upon application of said flavoring solution to the fruit surface.
4. The method of claim 1 wherein said freezing point depressant is selected from the class consisting of edible alcohols and oligosaccharides.
5. The method of claim 4 wherein said flavor solution has its freezing point reduced between 4° to 22° F. by addition of said freezing point depressant.
6. The method of claim 5 wherein said flavor solution contains artificial sweeteners selected from the class consisting of cyclamates, saccharins and mixtures thereof.
7. The method of claim 5 wherein said flavor solution contains from 7.5 to 35% oligosaccharides.
8. The method of claim 5 wherein said flavor solution contains from 2.5 to 20% by weight of an alcohol.
9. The method of claim 5 wherein said flavor solution is added at a ratio of 1.5 to 4.5 lbs. per 100 lbs. of frozen fruit and wherein said fruit is tempered to a product temperature of between 10° F. and 28° F., and said flavor solution contains an artificial sweetener selected from the class consisting of cyclamates, saccharin, and mixtures thereof.
10. The method of claim 6 wherein said flavor solution contains invert sugar as a freezing point depressant.
11. The method of claim 7 wherein the flavor solution has its freezing point reduced by 6° to 11° F. due to the addition of said freezing point depressant.

References Cited

UNITED STATES PATENTS

| | | | |
|---|---|---|---|
| 2,278,472 | 4/1942 | Musher | 99—193 XR |
| 2,286,225 | 6/1942 | Noyes | 99—193 |
| 2,876,105 | 3/1959 | Jucaitis et al. | |
| 3,356,512 | 12/1967 | Lemaire et al. | 99—204 |

OTHER REFERENCES

Olsen, "Cyclamates in Citrus Fruits." 1960, Florida State Horticultural Society, pp. 270–271.

RAYMOND N. JONES, Primary Examiner

J. M. HUNTER, Assistant Examiner

U.S. Cl. X.R.

99—100, 141